United States Patent
Leslie et al.

(10) Patent No.: US 11,807,444 B2
(45) Date of Patent: Nov. 7, 2023

(54) REUSABLE CONTAINER FOR DISPENSING PRODUCT IN STICK FORM

(71) Applicant: VERITY PACKAGING, INC., San Marcos, CA (US)

(72) Inventors: Kerri Leslie, Encinitas, CA (US); David Hurrle, San Marcos, CA (US)

(73) Assignee: VERITY PACKAGING, INC., San Marcos, CA (US)

( * ) Notice: Subject to any disclaimer, the term of this patent is extended or adjusted under 35 U.S.C. 154(b) by 0 days.

(21) Appl. No.: 17/395,669

(22) Filed: Aug. 6, 2021

(65) Prior Publication Data

US 2021/0362936 A1     Nov. 25, 2021

Related U.S. Application Data

(63) Continuation of application No. PCT/US2020/051679, filed on Sep. 19, 2020.
(Continued)

(51) Int. Cl.
    *B65D 83/00*      (2006.01)
    *A45D 40/04*      (2006.01)
    *A45D 40/06*      (2006.01)

(52) U.S. Cl.
    CPC .......... *B65D 83/0011* (2013.01); *A45D 40/04* (2013.01); *A45D 40/06* (2013.01)

(58) Field of Classification Search
    CPC ........ A45D 40/06; A45D 40/02; A45D 40/04; A45D 40/40; A45D 40/205;
(Continued)

(56) References Cited

U.S. PATENT DOCUMENTS

| 4,071,300 A | * | 1/1978 | Nichols .............. A46B 11/0027 |
| | | | 401/175 |
| 5,437,513 A | | 8/1995 | Favre |

(Continued)

FOREIGN PATENT DOCUMENTS

| GB | 863995 A | 3/1961 |
| WO | 2008026126 A1 | 3/2008 |

OTHER PUBLICATIONS

International Search Report dated Dec. 15, 2020 for International Application No. PCT/US2020/051679.
(Continued)

*Primary Examiner* — David J Walczak
(74) *Attorney, Agent, or Firm* — MASCHOFF BRENNAN

(57) ABSTRACT

In one embodiment, a container includes a housing assembly and an insert assembly. Each component of the housing assembly may designed to be reused, and each component of the insert assembly may be designed to be reused, recycled, or composted, depending on the materials employed for construction. Reusable components of the container may be constructed of non-reactive, durable materials that are not susceptible, or at least resistant, to rust and/or corrosion. Example materials for the reusable components include stainless steel, aluminum, carbon fiber, various types of polymers, and silicone. The container may be designed to allow simple and complete assembly and disassembly. The reusable parts may be cleaned, replaced, or repaired, as needed, and recyclable or compostable parts may be separated and cleaned in preparation for recycling or composting.

15 Claims, 5 Drawing Sheets

Related U.S. Application Data

(60) Provisional application No. 63/000,579, filed on Mar. 27, 2020, provisional application No. 62/903,667, filed on Sep. 20, 2019.

(58) Field of Classification Search
CPC .......... A45D 2040/208; B65D 83/0011; B65D 83/0005; B65D 83/0033
USPC ................................................ 401/171–175
See application file for complete search history.

(56) References Cited

U.S. PATENT DOCUMENTS

| | | |
|---|---|---|
| 5,662,425 A | 9/1997 | Mitsuya |
| 5,842,802 A * | 12/1998 | Lang ...................... A45D 40/04 401/175 |
| 6,089,774 A | 7/2000 | Franken et al. |
| 6,773,190 B2 * | 8/2004 | Matsumoto .......... B43K 23/016 401/75 |
| 7,270,495 B1 | 9/2007 | Preteroti |
| 8,187,578 B2 | 5/2012 | Walling et al. |
| 8,328,448 B1 | 12/2012 | Hufnagel |
| 2013/0193167 A1 | 8/2013 | Arora et al. |
| 2018/0086542 A1 | 3/2018 | Ellsworth et al. |

OTHER PUBLICATIONS

U.S. Appl. No. 62/581,476, filed: Nov. 3, 2017 First Named Inventor: Brian Craig Bushell.
Extended European Search Report, as issued in connection with European Application No. 20864356.9, dated Sep. 7, 2023, 8 pgs.

* cited by examiner

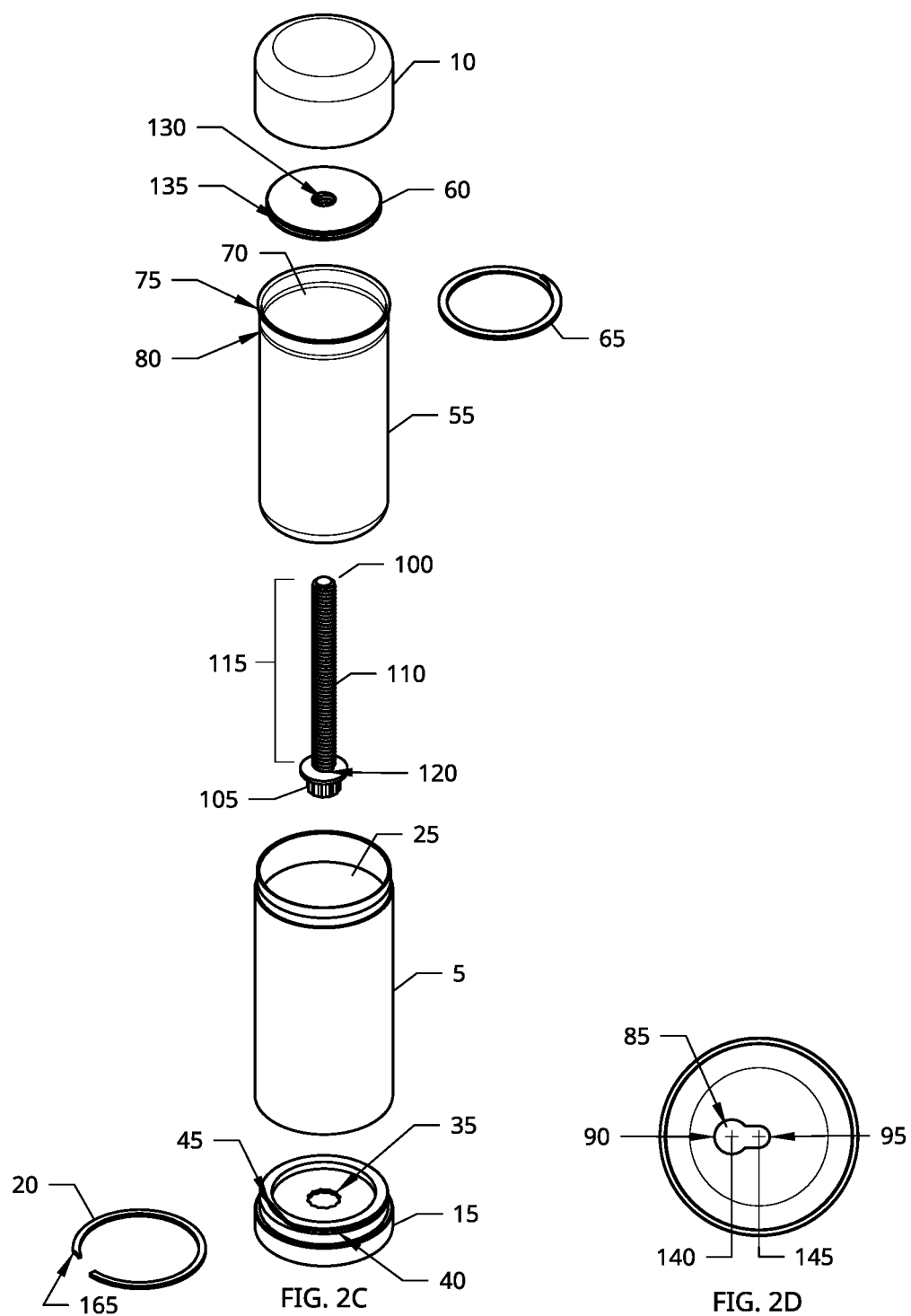

REUSABLE CONTAINER FOR DISPENSING PRODUCT IN STICK FORM

CROSS-REFERENCE TO RELATED APPLICATIONS

This application is a continuation of International Patent Application No. PCT/US2020/051679 filed Sep. 19, 2020 which claims the benefit of U.S. Provisional Patent Application No. 62/903,667 filed Sep. 20, 2019 and U.S. Provisional Patent Application No. 63/000,579 filed Mar. 27, 2020. The contents of these applications are incorporated herein by reference in their entirety.

BACKGROUND

The present application relates to the field of reusable containers for dispensing products in a stick form. Example products include, but are not limited to, skin, body, beauty, and personal care products, such as deodorant, sunscreen, lip balm, makeup, and topical medications, and any other product dispensed in stick form such as glue for example.

Plastic production and consumption have been increasing exponentially over the last several decades. Historically, containers for dispensing products in a stick form have been manufactured using plastic and are designed for single-use. Once the product is consumed, the container is disposed of, resulting in a tremendous amount of plastic waste, which negatively impacts the environment for decades, or longer, due to the slow decomposition of plastic. Although primarily constructed of plastic, the containers are poor candidates for recycling due, in part, to their complex construction. Thus, there is a need for additional contributions in this area.

The subject matter claimed herein is not limited to implementations that solve any disadvantages or that operate only in environments such as those described above. Rather, this background is only provided to illustrate one example technology area where some implementations described herein may be practiced.

SUMMARY

In one embodiment, a reusable container includes a housing assembly and an insert assembly. Each component of the housing assembly may be designed to be reused, and each component of the insert assembly may be designed to be reused, recycled, or composted, depending on the materials employed. Reusable components of the container may be constructed of non-reactive, durable materials that are not susceptible, or at least resistant, to rust and/or corrosion. Example materials for the reusable components include stainless steel, aluminum, carbon fiber, various types of polymers, and silicone. The container may be designed to allow simple and complete assembly and disassembly. Thus, reusable parts may be cleaned, replaced, or repaired, as needed, and recyclable or compostable parts may be separated for recycling or composting.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 2C is an exploded view of the container of FIG. 1;

FIG. 2D is a top plan view of an inner container of the container of FIG. 1;

DETAILED DESCRIPTION OF PREFERRED EMBODIMENTS

Figure 1:
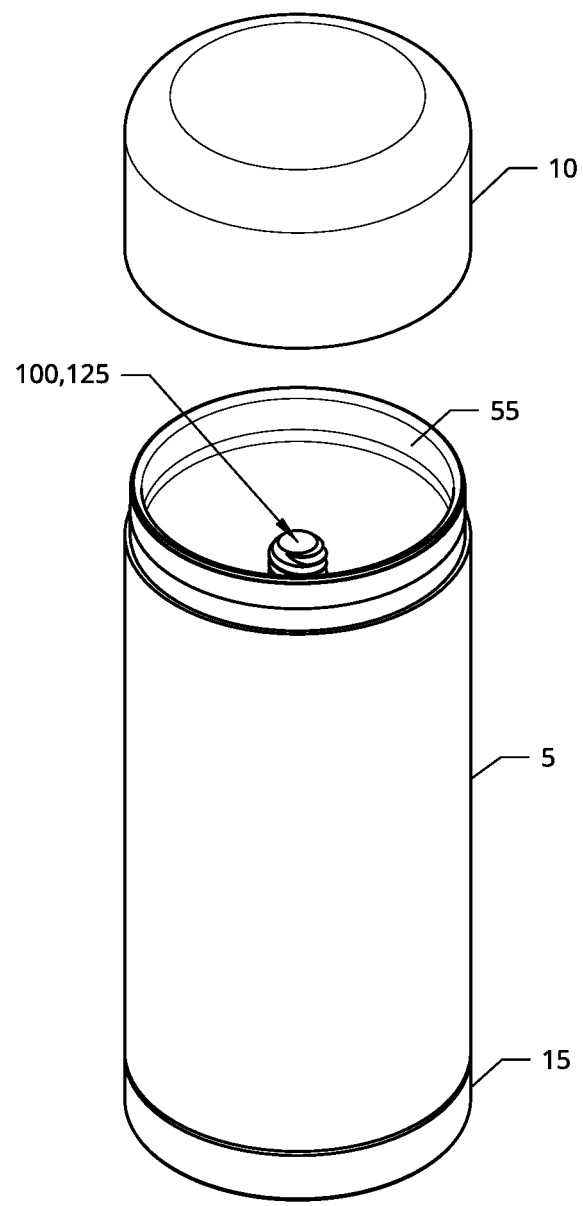
FIG. 1 is an exterior perspective view of one embodiment of a container.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Certain embodiments of the present application are illustrated in FIGS. 1-3C, where like reference numerals refer to like elements.

The Housing Assembly

The housing assembly includes tube 5, cap 10, knob 15, and retaining ring 20. Tube 5 includes an open top and bottom that open into cavity 25. Cap 10 and knob 15 may be removably secured to opposite ends of tube 5 to close tube 5 and form the housing assembly. As shown in the figures, in some embodiments, cap 10 engages tube 5 via a friction fit. However, in other embodiments, other releasable securing means, such as a snap fit or mated threading may be employed to secure cap 10 to tube 5, whereby cap 10 and tube 5 engage with one another via complementary male and female components.

Knob 15 may be releasably and rotatably coupled to a bottom portion of tube 5 through the assistance of retaining ring 20. Cavity 30 extends into open bottom of knob 15. Aperture 35 extends through the center of knob 15, whereby in an assembled state, open communication is provided between cavity 25 and base cavity 30. Channel 40, configured to receive retaining ring 20, is disposed along an outer circumference of an upper portion of knob 15.

Figure 2A:
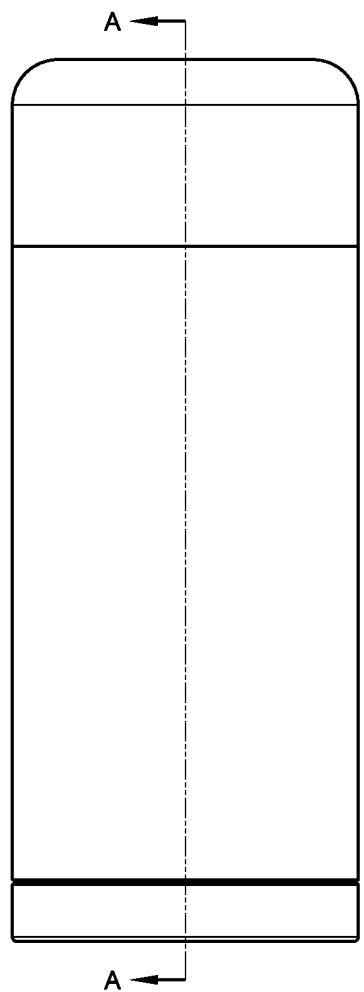
FIG. 2A is an exterior side view of the container of FIG. 1.
Figure 3A:
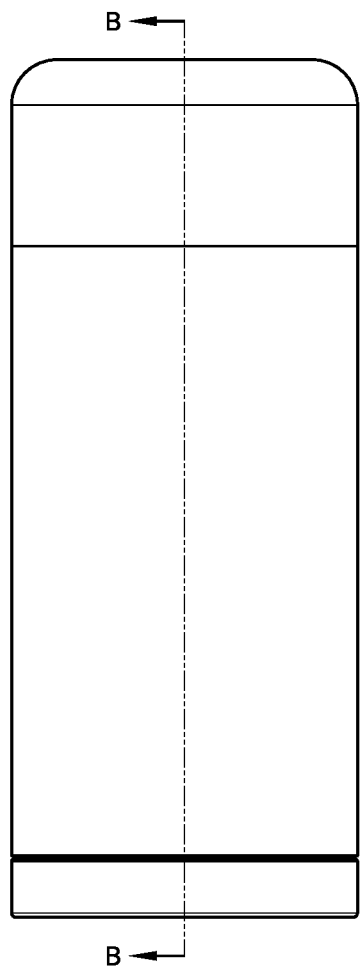
FIG. 3A is an exterior side view of an alternative embodiment of a container.
Figure 3B:
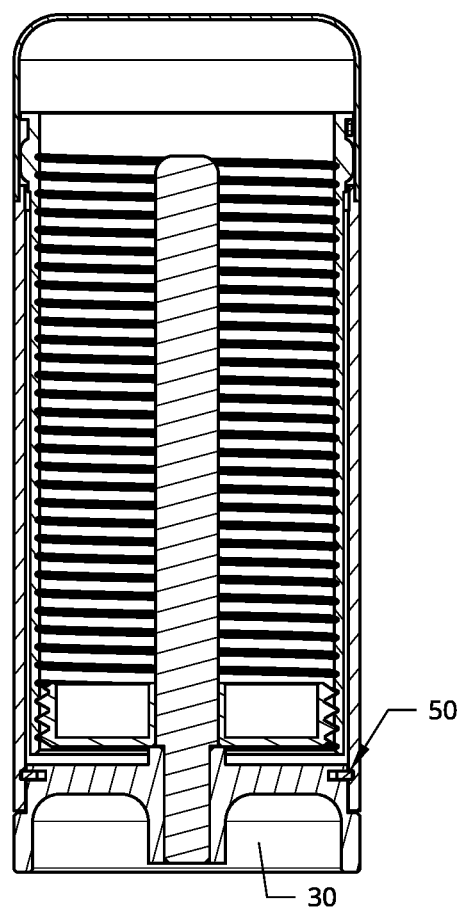
FIG. 3B is a section view of the container of FIG. 3A taken on line B-B of FIG. 3A.
Figure 3C:
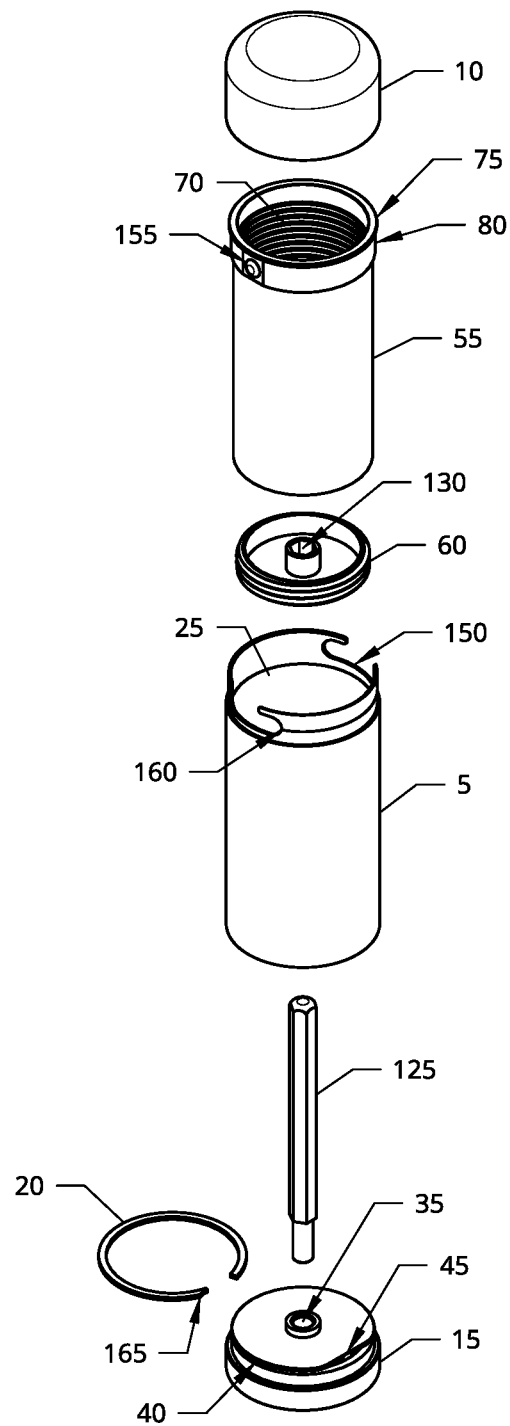
FIG. 3C is an exploded view of the container of FIG. 3A.

In some embodiments, as shown in FIGS. 2C and 3C, retaining ring 20 may be a C-ring constructed of a resilient material, such as metal or plastic polymer. However, other types of retaining rings, e.g., O-rings, could be employed to couple knob 15 to tube 5. The outer circumference of retaining ring 20 is larger than the circumference of the upper portion of knob 15, and the inner circumference of retaining ring 20 is slightly larger than the inner circumference of channel 40. Thus, when seated onto knob 15, retaining ring 20 protrudes from channel 40 and rotates freely within channel 40. Additionally, a predetermined amount of tolerance between retaining ring 20 and channel 40, allows retaining ring 20 to be squeezed, compressed, or otherwise deformed inwardly into channel 40.

In some embodiments where retaining ring 20 is a C-ring, recessed lip 45 at a top edge of channel 40 facilitates the seating and removal of retaining ring 20 into/from channel 40. Once retaining ring 20 is seated into channel 40, retaining ring 20 is compressed or squeezed inwardly, whereby retaining ring 20 is temporarily deformed from its native shape, to allow knob 15 with seated retaining ring 20 to be inserted into tube 5. Once fully inserted, such that channel 40 aligns with groove 50 on an interior of tube 5, retaining ring 20 springs back to its native, i.e., uncompressed, shape and seats into groove 50 to releasably couple knob 15 to tube 5, whereby knob 15 serves as the base of the reusable container.

In some embodiments where retaining ring 20 is an O-ring, the top lip of channel 40 may not include a recessed portion. In such an embodiment, retaining ring 20 is stretchable to facilitate seating and removal of retaining ring 20 into/from channel 40. Additionally, retaining ring 20 is flexible or compressible, such that it is capable of being temporarily deformed from its native shape as knob 15, with seated retaining ring 20, is inserted into tube 5. Once fully inserted, such that channel 40 aligns with groove 50, retaining ring 20 resumes its native shape and seats into groove 50 to releasably couple knob 15 to tube 5, whereby knob 15 serves as the base of the reusable container.

Although in the illustrated forms knob 15 is coupled to tube 5 via interaction between channel 40 and groove 50, it should be understood that other coupling means, e.g., a snap fit, that would allow knob 15 to rotate on tube 5 may additional or alternatively be utilized. For example, knob 15 may include a groove that extends along its circumference, interior or exterior, that is configured to receive and matingly engage tabs on a bottom portion of tube 5.

The Insert Assembly

The insert assembly includes inner container 55, follower 60, and, in some embodiments, retaining ring 65. Inner container 55 includes an open top that opens into cavity 70. Lip 75 extends along an outer circumference of an upper edge of inner container 55 to facilitate seating of the insert assembly within the housing assembly. Just below lip 75, friction ring 80 extends around the outer circumference of an upper portion of inner container 55. In some embodiments, friction ring 80 is machined into, or otherwise formed, e.g., by a molding process, as part of, inner container 55 during the manufacturing process. In other embodiments, friction ring 80 may be a separate, removable component, e.g., an O-ring, that seats onto inner container's outer circumference. In some embodiments, the bottom of inner container 55 is open, such that inner container 55 has a tubular structure. In other embodiments, aperture 85 extends through the base of inner container 55 and opens into cavity 70. Aperture 85 extends, lengthwise, across the center of the base, whereby the width of aperture 85 narrows—as, for example, in a keyhole configuration—from a first end 90 of the aperture 85 to a second end 95 of the aperture 85.

Figure 2B:
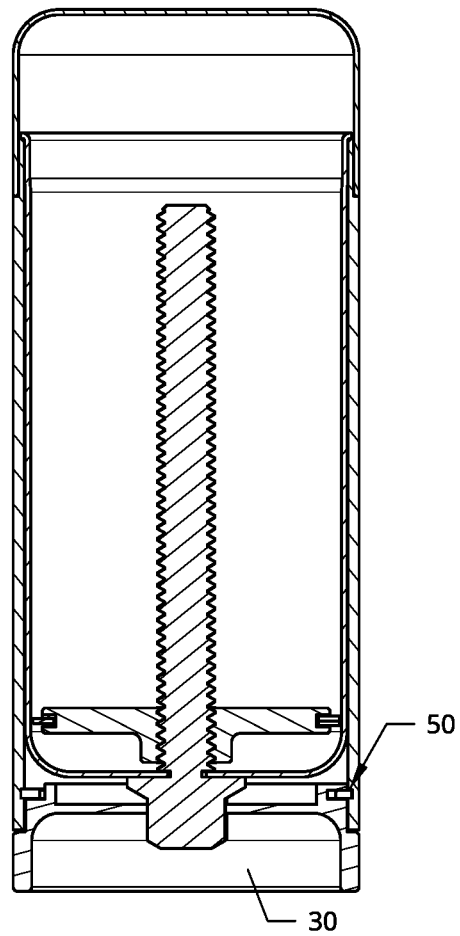
FIG. 2B is a section view the container of FIG. 1 taken on line A-A of FIG. 2A.

With reference to FIGS. 2B-2D, in various embodiments in which aperture 85 extends through the base of inner container 55, the insert assembly further includes screw 100. Screw 100 engages with inner container 55 to assist with moving follower 60 through inner container 55. Screw 100 includes screw head 105 and shaft 110 extending from screw head 105. Shaft 110 may be non-threaded or partially threaded. In some embodiments were shaft 110 is partially threaded, shaft 110 includes threaded portion 115 and non-threaded portion 120, whereby non-threaded portion 120 is disposed between screw head 105 and threaded portion 115. In one form, a longitudinal length of non-threaded portion 120 may be greater than the thickness of the base of inner container 55. Additionally, the widest portion of aperture 85, located adjacent to the first end 90 thereof, is dimensioned to allow shaft 110 to pass into and through aperture 85 and into cavity 70. Due to its larger diameter, screw head 105 is prevented from passing into aperture 85, i.e., it remains at an exterior of the base of inner container 55.

With reference to FIGS. 3B-3C, in various embodiments that employ a tubular inner container 55, shaft 125 is used in lieu of screw 100. Shaft 125 may be threaded, partially threaded, or nonthreaded. Shaft 125 may be fixedly, i.e., irremovably, attached to knob 15. For example, shaft 125 may be machined or otherwise formed, e.g., by a molding process, as part of knob 15 during the manufacturing process. Alternatively, the lower end of shaft 125 may releasably seat into knob aperture 35, thereby allowing shaft 125 to be disengaged from knob 15 for cleaning or other purposes. For example, the lower end of shaft 125 may engage knob 15 via a friction/press fit or other releasable engagement means, such that, upon engagement, shaft 125 is immobilized, i.e., prevented from rotating within aperture 35, until unseated. In such an embodiment, aperture 35 may have a closed bottom to eliminate open communication between cavity 25 and base cavity 30 and prevent shaft 125 from passing into base cavity 30. Knob aperture 35 and the portion of shaft 125 seated within knob aperture 35 can be configured into any combination of complementary shapes so long as, when engaged, rotation of knob 15 rotates shaft 125, and vice versa.

Aperture 130 extends through the center of follower 60. Aperture 130 may be threaded or non-threaded. As illustrated in FIGS. 2B-2C, in embodiments in which aperture 130 is threaded, the diameter and threading of aperture 130 are configured to complement the diameter and threading of shaft 125 or screw 100, allowing follower 60 to be threaded onto shaft 125 or screw 100. In such an embodiment, channel 135 extends into and along an outer circumference of follower 60, whereby retaining ring 65 is removably insertable into channel 135. Retaining ring 65 is flexible or compressible to allow retaining ring 65 to engage the interior wall of inner container 55 and scrape product along the interior wall as follower 60 advances threaded portion 115 up through inner container 55. Retaining ring 65 may be a spiral ring (as shown in FIGS. 2C and 3C), an O-ring, or other similar ring constructed of metal, plastic, or any other material suitable for executing the function(s) of retaining ring 65.

In some embodiments, as illustrated in FIGS. 3B-3C, follower 60 with a non-threaded aperture 130 is coupled with a non-threaded screw 100 or shaft 125 having a longitudinal cross-sectional shape that is complementary to the shape of aperture 130, such that when engaged, rotation of shaft 125 or screw 100 rotates follower 60, and vice versa. In such an embodiment, the outer circumferential surface of follower 60 and interior wall of inner container 55 are at least partially threaded, whereby the outer circumferential surface of follower 60 matingly engages the interior wall surface of inner container 55 via complementary threading to move follower 60 up or down a longitudinal length of shaft 125 through inner container 55 as shaft 125 or screw 100 is rotated.

With reference to FIGS. 2B-2D, for embodiments that employ screw 100, assembly of the insert assembly begins with inserting threaded portion 115 or screw 100 through the widest portion of aperture 85. Once screw 100 is fully inserted, such that screw head 105 is abutting an exterior surface of the base of inner container 55, screw 100 is moved laterally to an opposite end of aperture 85 to transition screw 100 from unlocked position 140 to locked position 145. In locked position 145, non-threaded portion 120 of screw 100 is seated within aperture 85, whereby threaded portion 115 of screw 100 is disposed entirely within cavity 70 and screw 100 is axially aligned with inner container 55. Next, in embodiments that employ retaining ring 65, retaining ring 65 is fed into follower channel 135 until fully seated around the circumference of follower 60. Finally, follower 60 is coupled to screw 100 and is threaded down into inner container 55 by threaded engagement with threaded portion 115 of screw 100. Alternatively, in embodiments that employ non-threaded screw 100, follower 60 is threaded down into inner container 55 by threaded engagement with the inner wall of inner container 55.

The insert assembly is inserted into the housing assembly through the top opening of the housing assembly. In embodiments where shaft 125 is used, the insert assembly may be assembled before, during, or after engagement of inner container 55 with tube 5. For example, in some embodiments where shaft 125 is threaded or partially threaded, follower 60 is coupled with inner container 55 prior to inner container 55 being inserted into tube 5. In other embodiments where shaft 125 is non-threaded, follower 60 is coupled with inner container 55 prior to, as or after inner container 55 is inserted into tube 5. As inner container 55 is inserted into tube 5, friction ring 80 of inner container 55 and an upper circumferential portion of the inner wall of tube 5 engage one another via an interference fit, e.g., a friction fit, to releasably seat inner container 55 into tube 5. Alternatively, a snap fit connection (not shown), e.g., between the inner wall of tube 5 and the outer wall of the inner container 55, can be used to releasably seat inner container 55 into tube 5. For embodiments that include screw 100, during the seating process, screw head 105 is aligned with, and passes through, knob aperture 35 to allow the insert assembly to seat within the housing assembly. Inner container 55 is fully seated when lower edge of lip 75 seats onto upper edge of tube 5.

Engagement of screw head 105 or shaft 125 and knob 15 allows knob 15 to serve as a mechanical actuator, whereby rotation of knob 15 in a first direction causes rotation of screw 100 or shaft 125 to move follower 60 up a longitudinal length of threaded portion 115 of screw 100 or shaft 125 and, conversely, rotation of knob 15 in a second direction causes rotation of screw 100 or shaft 125 to move follower 60 down a longitudinal length of threaded portion 115 of screw 100 or shaft 125. Although screw head 105 and shaft 125 are depicted in the drawings as having specific shapes, other variations are possible and contemplated. Screw head 105 or shaft 125 and knob aperture 35, respectively, can be configured into any combination of complementary shapes so long as, when engaged, rotation of knob 15 rotates screw 100 or shaft 125, and vice versa.

As illustrated in FIG. 2B, when screw 100 is employed, the longitudinal length of screw head 105 protruding below a lower edge of knob aperture 35 when the insert assembly is fully seated in the housing assembly may be equal to or greater than the height, i.e., the longitudinal length, of friction ring 80. This allows a means for removing the insert assembly from the housing assembly, whereby upon stabilization of tube 5, e.g., by firmly gripping tube 5, a user may apply upward force on screw head 105 (accessed through base cavity 30), thereby forcing the insert assembly upward to break the friction between friction ring 80 of inner container 55 and the inner wall of tube 5 (or, alternatively, the snap fit connection(s) between the housing assembly and the insert assembly) to disengage the insert assembly from the housing assembly.

In some embodiments where shaft 125 is non-threaded and does not extend beyond the threading on the interior wall of inner container 55, follower 60 must be retracted down through inner container 55 to facilitate removal of inner container 55 from tube 5. In various other embodiments, disassembly of the insert assembly requires removal of follower 60 from inner container 55 by advancing follower 60 upward until uncoupled from screw 100 or shaft 125 and, in embodiments that employ retaining ring 65, unseating retaining ring 65 from follower 60. For embodiments that employ screw 100, disassembly of the insert assembly also requires transitioning screw 100 from locked position 145 to unlocked position 140 and removing screw 100 from inner container 55 through aperture 85.

With reference to FIGS. 3B-3C, in some embodiments, cutouts 150, disposed at the top of tube 5, are provided to facilitate removal of inner container 55 through the top opening of the housing assembly once follower 60 is disengaged from shaft 125. Cutouts 150 may allow a user to readily access and grip inner container 55 to facilitate removal of inner container 55 from tube 5.

With further reference to FIGS. 3B-3C, in some embodiments, tube 5 and inner container 55 are configured to interlock. In such an embodiment, locking components 155, 160 are disposed at an upper portion of inner container 55 and tube 5, respectively. Although locking component 160 is shown as an extension of cutout 150, locking component 160 and cutout 150 may be physically separated from one another along the upper portion of tube 5. As inner container 55 is received into tube 5, locking component 155 matingly engages locking component 160 to releasably lock inner container 55 to tube 5. The figures depict locking component 155 as an outwardly-protruding tab and locking component 160 as a receiving element, i.e., channel, for receiving locking component 155. However, this is meant for illustrative purposes only and is not meant to limit the locking mechanism to any particular form, as other mechanisms for interlocking inner container 55 and tube 5 may be employed. Locking components 155, 160 can be used in addition to, or as an alternative to, friction ring 80, snap fit connection, or other releasable engagement means for securing inner container 55 to tube 5.

Once the insert assembly is removed from the housing assembly, the housing assembly can be disassembled. Disassembly of the housing assembly involves the steps of removing knob 15 from tube 5, followed by unseating retaining ring 20 from knob channel 40. In some embodiments, where retaining ring 20 is a C-ring, the step of removing knob 15 from tube 5 is facilitated through use of a tool (not shown). The tool may be configured to engage tab 165 to facilitate deformation, i.e., compression, of retaining ring 20 from its native shape to unseat retaining ring 20 from groove 50, thereby allowing knob 15 to be removed from tube 5. Once knob 15 is removed from tube 5, retaining ring 20 springs back to its native shape. For embodiments that include shaft 125, where shaft 125 is removably secured to knob 15, disassembly of the housing assembly may also involve disengaging shaft 125 from knob 15.

In embodiments where retaining ring 20 is an O-ring, the step of removing knob 15 from tube 5 may be accomplished by firmly gripping tube 5 and pulling knob 15 in a direction opposite of tube 5. As knob 15 is pulled, retaining ring 20 is unseated from groove 50 and is temporarily deformed from its native shape, allowing knob 15 with seated retaining ring 20 to be removed from tube 5. Once knob 15 is removed from tube 5, retaining ring 20 may resume its native shape.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A container for dispensing product in a stick form, comprising:
   a tube;
   a knob removably and rotatably coupled to a lower portion of the tube;
   an inner container removably seated within the tube, wherein the inner container is inserted through a top opening of the tube;
   a shaft in communication with the knob; and
   a follower removably coupled with the shaft;
   wherein rotation of the knob is configured to rotate the shaft and rotation of the shaft is configured to move the follower through the inner container; and
   wherein the shaft comprises a shaft portion and a head portion, wherein a diameter of the head portion is greater than a diameter of the shaft portion, wherein a base of the inner container comprises an elongated aperture, wherein a first end of the elongated aperture is dimensioned to receive the shaft portion, wherein, when received, the shaft is transitionable between an unlocked position at the first end of the elongated aperture and a locked position at a second end of the elongated aperture, wherein, in the locked position, the shaft is axially aligned with the inner container.

2. A container for dispensing product in a stick form, comprising:
   a tube including a top opening;
   a knob removably and rotatably coupled to a lower portion of the tube;
   an inner container removably seated within the tube, wherein the inner container includes a base and is positionable in the tube through the top opening of the tube;
   a shaft in communication with the knob; and
   a follower removably coupled with the shaft;
   wherein rotation of the knob is configured to rotate the shaft and rotation of the shaft is configured to move the follower through the inner container; and
   wherein the base of the inner container comprises an elongated aperture, the elongated aperture including a first end, a second end, a first width at the first end, and a second width at the second end, the first width being greater than the second width.

3. The container of claim 2, wherein the first width and the second width of the elongated aperture cooperate to provide the elongated aperture with a keyhole configuration.

4. The container of claim 2, wherein the shaft is positionable in the elongated aperture between an unlocked position at the first end of the elongated aperture and a locked position at the second end of the elongated aperture.

5. The container of claim 4, wherein the shaft includes a shaft portion and a head portion, and the elongated aperture is configured to prevent passage of the head portion therethrough.

6. The container of claim 2, further comprising a first retaining ring removably coupled to the knob, wherein the first retaining ring is configured to seat into a groove in an inner wall of the tube to removably couple the knob to the tube.

7. The container of claim 6, wherein the first retaining ring is a C-ring.

8. The container of claim 6, further comprising a second retaining ring removably coupled to the follower, wherein the second retaining ring is configured to engage an inner wall of the inner container as the follower moves through the inner container.

9. The container of claim 8, wherein the second retaining ring is a spiral retaining ring.

10. The container of claim 2, wherein the shaft includes a head positionable in a receptacle of the knob, wherein when positioned in the receptacle of the knob the head is accessible through a cavity in the knob and application of force on the head induces displacement of the inner container from the tube.

11. The container of claim 2, wherein the inner container comprises a first locking component and the tube comprises a second locking component, wherein the first locking component is configured to matingly engage the second locking component to releasably lock the inner container to the tube.

12. The container of claim 2, further comprising a friction ring coupled to the inner container and configured to frictionally engage an interior wall of the tube.

13. A container for dispensing product in a stick form, comprising:
a tube including a top opening;
a knob removably and rotatably coupled to a lower portion of the tube;
an inner container removably seated within the tube, wherein the inner container includes a base and is positionable in the tube through the top opening of the tube;
a shaft in communication with the knob; and
a follower removably coupled with the shaft, the follower including an upper surface, a lower surface, a body portion spanning a space between the upper surface and the lower surface, and a retaining ring removably coupled to the follower and positioned between the upper surface and the lower surface;
wherein rotation of the knob is configured to rotate the shaft and rotation of the shaft is configured to move the follower through the inner container;
wherein the retaining ring is configured to engage an inner wall of the inner container as the follower moves through the inner container; and
wherein the base of the inner container comprises an elongated aperture, the elongated aperture including a first end, a second end, a first width at the first end, and a second width at the second end, the first width being greater than the second width.

14. The container of claim 13, wherein the retaining ring is a spiral retaining ring.

15. The container of claim 13, wherein the first width and the second width of the elongated aperture cooperate to provide the elongated aperture with a keyhole configuration.

* * * * *